United States Patent
Johnson (10) Patent No.: US 9,837,895 B2
(45) Date of Patent: *Dec. 5, 2017

(54) BATTERY POWER SUPPLY WITH AUTOMATIC LOAD SENSING

(71) Applicant: ClevX, LLC, Kirkland, WA (US)

(72) Inventor: Simon B. Johnson, Bonney Lake, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/083,249

(22) Filed: Mar. 28, 2016

(65) Prior Publication Data

US 2016/0211746 A1 Jul. 21, 2016

Related U.S. Application Data (63) Continuation of application No. 13/785,077, filed on Mar. 5, 2013, now Pat. No. 9,300,203, which is a continuation-in-part of application No. 12/747,513, filed as application No. PCT/US2008/086301 on Dec. 10, 2008, now Pat. No. 9,184,629, said application No. 13/785,077 is a continuation-in-part of application No. 13/218,336, filed on Aug. 25, 2011, now abandoned.

(Continued)

(51) Int. Cl.
| | |
|---|---|
| H02M 3/156 | (2006.01) |
| H02J 7/00 | (2006.01) |
| H02M 1/08 | (2006.01) |
| H02M 1/00 | (2006.01) |

(52) U.S. Cl.
CPC ........... *H02M 3/156* (2013.01); *H02J 7/0065* (2013.01); *H02M 1/08* (2013.01); *H02M 2001/0009* (2013.01)

(58) Field of Classification Search
CPC ............... H02J 1/00; H02J 7/00; H02J 7/0065
USPC .......................................................... 307/150
See application file for complete search history.

(56) References Cited

U.S. PATENT DOCUMENTS

| 5,691,618 A | 11/1997 | Kobayashi et al. |
| 5,835,366 A | 11/1998 | Pleso et al. |

(Continued)

FOREIGN PATENT DOCUMENTS

| JP | 2000270472 | 9/2000 |
| JP | 2000270472 A | 9/2000 |

(Continued)

OTHER PUBLICATIONS

"U.S. Appl. No. 12/747,513, 312 Amendment filed Jul. 30, 2015", 4 pgs.

(Continued)

*Primary Examiner* — Robert Deberadinis
(74) *Attorney, Agent, or Firm* — Schwegman Lundberg & Woessner, P.A.

(57) ABSTRACT

A power supply, and a method of operation thereof, includes: a power source; a microcontroller for comparing a first sense potential with a second sense potential for generating a potential booster enable; and a relative isolation unit for isolating the first sense potential from the second sense potential; and a potential booster for controlling an output potential, the potential booster controlled by the potential booster enable from the microcontroller.

20 Claims, 6 Drawing Sheets

Related U.S. Application Data (60) Provisional application No. 61/012,700, filed on Dec. 10, 2007, provisional application No. 61/377,089, filed on Aug. 25, 2010.

(56) References Cited

U.S. PATENT DOCUMENTS

| | | |
|---|---|---|
| 6,208,535 B1 | 3/2001 | Parks |
| 6,873,062 B1 | 3/2005 | Makino |
| 6,978,934 B2 | 12/2005 | Feng |
| 6,981,161 B2 | 12/2005 | Koo |
| 7,020,519 B2 | 3/2006 | Greatbatch et al. |
| 7,042,161 B1 | 5/2006 | Konopka |
| 7,069,447 B1 | 6/2006 | Corder |
| 7,166,987 B2 | 1/2007 | Lee et al. |
| 7,274,116 B2 | 9/2007 | Inoue et al. |
| 7,375,494 B2 | 5/2008 | Daniel et al. |
| 7,531,986 B2 | 5/2009 | Eager et al. |
| 7,821,228 B2 | 10/2010 | Zhu et al. |
| 7,839,388 B2 | 11/2010 | Cheah et al. |
| 7,863,856 B2 | 1/2011 | Sherman et al. |
| 7,956,576 B2 | 6/2011 | Neu et al. |
| 8,004,237 B2 | 8/2011 | Manor et al. |
| 8,111,042 B2 | 2/2012 | Bennett |
| 8,415,923 B2 | 4/2013 | Forsythe |
| 8,513,914 B2 | 8/2013 | Tan et al. |
| 8,832,440 B2 | 9/2014 | Johnson et al. |
| 9,075,571 B2 | 7/2015 | Bolotin et al. |
| 9,184,629 B2 * | 11/2015 | Johnson .............. G06F 1/3203 |
| 9,262,611 B2 | 2/2016 | Johnson et al. |
| 9,300,203 B2 * | 3/2016 | Johnson .............. H02J 7/0065 |
| 2003/0051177 A1 | 3/2003 | Koo |
| 2004/0060985 A1 | 4/2004 | Feng |
| 2004/0166904 A1 | 8/2004 | Kuo |
| 2006/0006850 A1 | 1/2006 | Inoue et al. |
| 2006/0103344 A1 | 5/2006 | Hassan et al. |
| 2007/0029969 A1 | 2/2007 | Wang et al. |
| 2007/0241721 A1 | 10/2007 | Weinstein et al. |
| 2007/0262243 A1 | 11/2007 | Cheah et al. |
| 2008/0197801 A1 | 8/2008 | Manor et al. |
| 2009/0102294 A1 | 4/2009 | Hodges et al. |
| 2009/0128090 A1 | 5/2009 | Bi |
| 2011/0095728 A1 | 4/2011 | Chen et al. |
| 2011/0187324 A1 | 8/2011 | Tan et al. |
| 2012/0049800 A1 | 3/2012 | Johnson et al. |
| 2016/0119339 A1 | 4/2016 | Bolotin et al. |
| 2016/0259736 A1 | 9/2016 | Bolotin et al. |

FOREIGN PATENT DOCUMENTS

| | | |
|---|---|---|
| JP | 2007102370 | 4/2007 |
| JP | 2007102370 A | 4/2007 |
| KR | 100559946 | 3/2006 |
| KR | 100559946 B1 | 3/2006 |
| WO | 2009076484 A2 | 6/2009 |
| WO | WO-2009076484 | 6/2009 |

OTHER PUBLICATIONS

"U.S. Appl. No. 12/747,513, Appeal Brief filed Jan. 5, 2015", 22 pgs.

"U.S. Appl. No. 12/747,513, Final Office Action mailed Dec. 5, 2012", 8 pgs.

"U.S. Appl. No. 12/747,513, Non Final Office Action mailed Mar. 4, 2015", 8 pgs.

"U.S. Appl. No. 12/747,513, Non Final Office Action mailed Aug. 16, 2012", 10 pgs.

"U.S. Appl. No. 12/747,513, Notice of Allowance mailed Jun. 15, 2015", 7 pgs.

"U.S. Appl. No. 12/747,513, PTO Response to Rule 312 Communication mailed Aug. 20, 2015", 2 pgs.

"U.S. Appl. No. 12/747,513, Response filed Jun. 4, 2015 to Non Final Office Action mailed Aug. 16, 2012", 12 pgs.

"U.S. Appl. No. 12/747,513, Response filed Nov. 16, 2012 to Non Final Office Action mailed Aug. 16, 2012", 23 pgs.

"U.S. Appl. No. 13/218,336, Final Office Action mailed Apr. 10, 2014", 17.

"U.S. Appl. No. 13/218,336, Non Final Office Action mailed Sep. 13, 2013", 19 pgs.

"U.S. Appl. No. 13/218,336, Response filed Dec. 16, 2013 to Non Final Office Action mailed Sep. 13, 2013", 11 pgs.

"U.S. Appl. No. 13/785,077, Notice of Allowance mailed Nov. 18, 2015", 12 pgs.

"International Application Serial No. PCT/US2008/086301, International Preliminary Report on Patentability mailed Jun. 15, 2010", 5 pgs.

"International Application Serial No. PCT/US2008/086301, International Search Report mailed Aug. 17, 2009", 2 pgs.

"International Application Serial No. PCT/US2008/086301, Written Opinion mailed Aug. 17, 2009", 4 pgs.

* cited by examiner

BATTERY POWER SUPPLY WITH AUTOMATIC LOAD SENSING

CROSS REFERENCE TO RELATED APPLICATIONS

This is a Continuation of co-pending U.S. patent application Ser. No. 13/785,077 filed Mar. 5, 2013, which is a Continuation-in-Part of U.S. patent application Ser. No. 12/747,513 filed Jun. 10, 2010, now U.S. Pat. No. 9,184,629, which is the National Stage of International Application No. PCT/US2008/086301 filed Dec. 10, 2008, which claims the benefit of provisional patent application No. 61/012,700 filed Dec. 10, 2007; co-pending U.S. patent application Ser. No. 13/785,077 is also a Continuation-in-Part of U.S. patent application Ser. No. 13/218,336 filed Aug. 25, 2011, now abandoned, which claims the benefit of provisional patent application No. 61/377,089 filed Aug. 25, 2010.

STATEMENT REGARDING FEDERALLY SPONSORED RESEARCH OR DEVELOPMENT

Not applicable.

FIELD OF THE INVENTION

The present invention relates generally to battery powered supplies for electronic devices and more particularly, to a means of improving battery shelf life by eliminating self-discharge of battery powered supplies.

BACKGROUND OF THE INVENTION

Many of the devices we come to depend on today are battery powered: cell phones, tablets, MP3 players, etc. These typically have a battery power supply that can be recharged, and can typically be recharged from either an AC power source using an adapter or a powered USB port for charging the battery power supply. Conventional devices of this type typically require a +5 volt DC source for charging the battery power supply.

A common issue facing all battery powered devices is they need to re-charge—sometimes when a suitable charging port is not available. To this end, there have been a number of auxiliary supplies sold that consist of a battery source that, when connected to a cell phone, provide extended operation.

Batteries do not, by their nature, provide a consistent voltage at the anode. For example, an alkaline battery might start at 1.6 volts when purchased, but will fade to about 0.9 volts when it is determined depleted. This means that any 5 volt supply generated from a set of four such batteries would benefit from having an internal voltage booster capable of compensating for a drifting supply in order to prolong the interval between recharging of the batteries (in the case of rechargeable batteries) or replacement of the batteries (in the case of disposable batteries).

Most backup supplies of the type discussed above that are sold on the market come equipped with a switch for activating their internal voltage booster. This internal voltage booster requires additional power for operation. Even with no load, an auxiliary power supply is susceptible to self-discharge. The user must remember to turn off the unit when disconnecting a load. Failure to do so means the auxiliary power source may not be available when needed in the future.

An example of a prior art device of the type described above is a Duracell Instant USB charger for cell phones. Booster circuitry within this charger draws current whether powering an external load or whether powering nothing. It is like the electronics in a typical PC computer—it consumes power whether the PC computer is in use or whether the user has left the room and the PC computer sits idle.

SUMMARY OF THE INVENTION

The present invention provides a battery power supply apparatus that is an auxiliary battery powered source capable of generating a substantially fixed voltage source for powering connected devices. In this apparatus, a battery—which can include a plurality of batteries connected in series—is provided that is a voltage source that fluctuates as battery capacity diminishes. Thus, the battery voltage may diminish with time, and this is referred to herein as battery drift. The present invention provides a voltage booster to compensate for this battery drift, for the purpose of providing a constant output voltage. The power supply includes: a power source; a microcontroller for comparing a first sense potential with a second sense potential for generating a potential booster enable; a relative isolation unit for isolating the first sense potential from the second sense potential; and a potential booster for controlling an output potential, the potential booster controlled by the potential booster enable from the microcontroller.

A switch, in parallel with a passive component, is used for the detection of a load. With the switch off, a load draws current through the passive component creating a voltage drop. At a predetermined threshold, a micro-controller is activated that triggers a voltage booster to provide a fixed voltage at the output. The switch is then turned ON, providing a zero resistance path to the voltage booster.

By monitoring the voltage potential at the battery and across the passive component, the micro-processor is able to determine when a load has been disconnected or has been turned off. Upon determination that a load no longer exists, the switch is turned off, the voltage booster is disabled, and the micro-controller waits for the connection of a load. The method of operation of the power supply includes: measuring a first sense potential of a power source; measuring a second sense potential coupled to the first sense potential in parallel across a relative isolation unit; comparing the first sense potential to the second sense potential with a microcontroller to generate a potential booster enable; providing a potential booster controlled by the potential booster enable from the microcontroller; and controlling an output potential based on the potential booster.

DETAILED DESCRIPTION OF THE INVENTION

Figure 1:
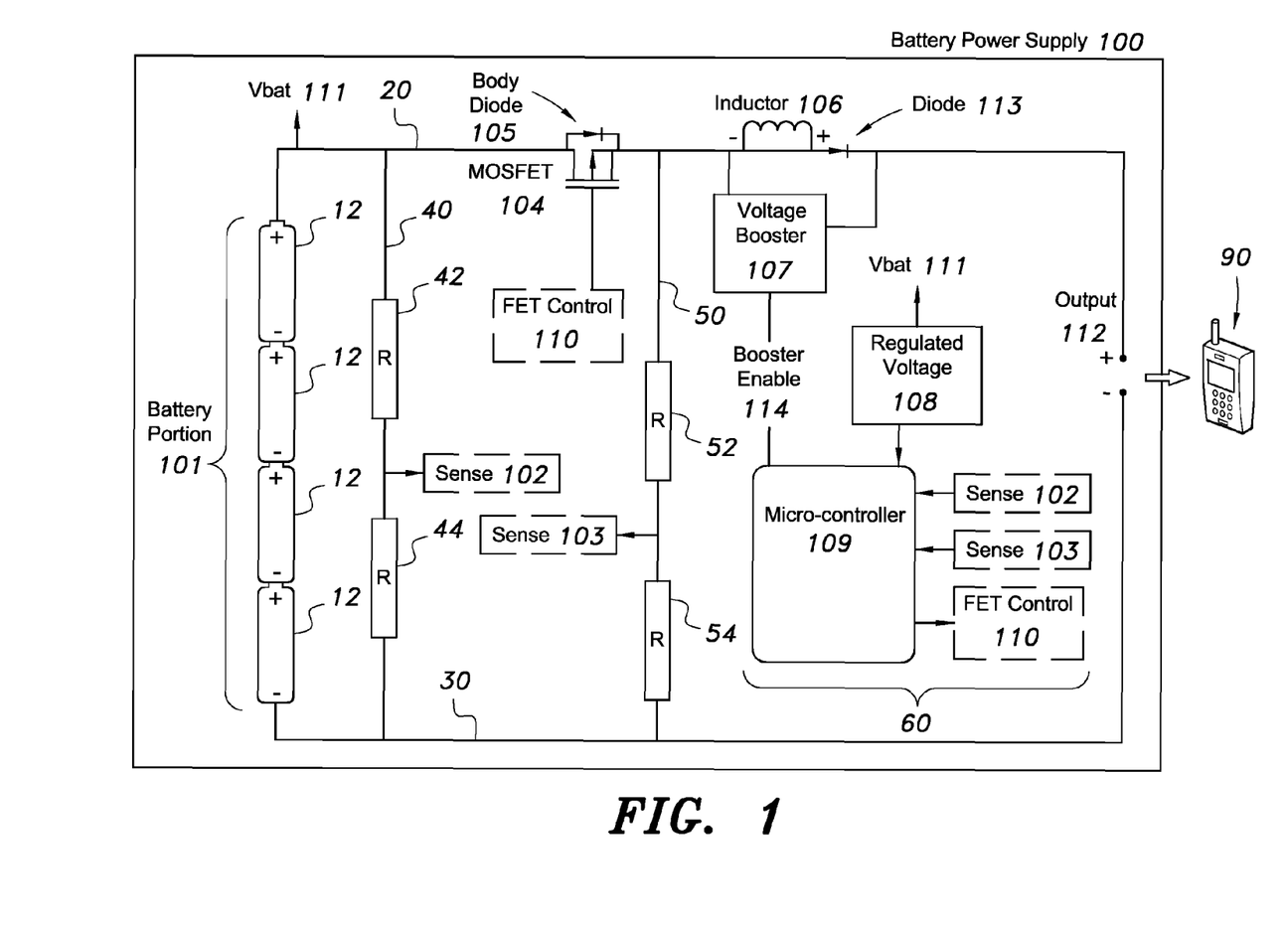
FIG. 1 is a schematic diagram of an apparatus for a battery power supply apparatus having a battery portion and an electrical circuit connected to the battery portion.

FIG. 1 is a schematic diagram of a battery power supply apparatus 100 having a battery portion 101 and an electrical circuit (discussed further hereunder) which has an output 112 for connection to a load. The battery portion 101 includes one or more batteries 12, and for the example shown and described herein, the battery portion 101 includes four identical batteries 12 connected in series. This battery arrangement with four batteries 12 is typical of many practical devices.

The above-mentioned electrical circuit includes a first circuit path 20 connected to a positive terminal of the battery portion 101 having a voltage indicated as Vbat 111 in FIG. 1, and continuing to a positive side of the output 112. The first circuit path 20, going in direction from the positive battery terminal indicated at Vbat 111 in FIG. 1, includes a MOSFET 104 having an integral body diode 105 (one specific example of a MOSFET having an integral body diode is a model no. NTGS3443), an inductor 106, and a diode 113. The inductor 106 and diode 113 are controlled by a voltage booster 107. The above-mentioned electrical circuit also includes a second circuit path 30, which is connected between a negative terminal of the battery portion 101 and continuing to a negative side of the output 112.

It is noted that the circuit elements which include the MOSFET 104 and the integral body diode 105 taken together form a controllable ON-OFF portion, the term "controllable ON-OFF portion" being a designation used herein for the function of these circuit elements. However, although the MOSFET 104 and the integral body diode 105 form the preferred embodiment, the present invention is not limited to use of a MOSFET circuit element, and other circuit arrangements can be used which would perform similar functions, as discussed further below.

Examples follow of equivalent types of circuits which are contemplated for use for the controllable ON-OFF portion (defined above), and which could be used in place of the MOSFET 104 and the body diode 105. More specifically, the following are examples of equivalent circuits for the "controllable ON-OFF portion":

First example: a bipolar transistor (not shown) with discrete diode connected between collector and emitter. The voltage drop can be detected across the discrete diode when the bipolar transistor is turned OFF. Turning the bipolar transistor ON removes that diode from the current path.

Second example: a bipolar transistor (not shown) with a resistor connected between the collector and emitter. The voltage drop can be detected across the resistor with the bipolar transistor OFF. Turning the bipolar transistor ON effectively removes the resistor from the current path.

Third example: either a discrete diode (not shown) or a resistor connected across a relay (not shown). A voltage drop is detected across the relay in the open state. Closing the relay effectively removes both passive components from the current path.

In general, the MOSFET 104 provides two important features:

When OFF, it provides a means of sensing current by creating a voltage drop that is detected by the sense inputs 102 and 103 when current passes through the internal body diode 105.

When ON, it provides a short circuit eliminating the voltage drop created by current sensing mechanism in 1.

The examples above provide an alternate means of accomplishing approximately the same thing.

It is contemplated that anyone having skill in the circuit design arts would understand how to implement these example replacement circuits, as well as any other arrangements which perform the same functions as are required of the MOSFET 104 and body diode 105 in the present invention as discussed hereinabove.

The above-mentioned electrical circuit includes a third circuit path 40 connecting the first circuit path 20 with the second circuit path 30, the third circuit path 40 having one end thereof connected between the MOSFET 104 and the positive terminal of the battery portion 101 and having the other end thereof connected to the second circuit path 30. The third circuit path 40 includes a first resistor 42 and a second resistor 44. A sense 102 is shown in dashed outline in FIG. 1 positioned to sense voltage between the first resistor 42 and the second resistor 44.

The battery power supply apparatus 100 also includes a fourth circuit path 50 connecting the first circuit path 20 with the second circuit path 30, the fourth circuit path 50 having one end thereof connected between the MOSFET 104 and the inductor 106, and having the other end thereof connected to the circuit path 30. The circuit path 50 includes a third resistor 52 and a fourth resistor 54. A sense 103 is shown in dashed outline in FIG. 1 positioned to sense voltage between the third resistor 52 and the fourth resistor 54. The third circuit path 40 and the fourth circuit path 50 together with the resistors (42, 44) and (52, 54) constitute voltage dividers, and the resistors (42, 44) and (52, 54) are voltage divider resistors.

The above-mentioned electrical circuit further includes a booster control portion 60, which includes a micro-controller 109, a voltage booster 107, and a regulated voltage 108 connected to the micro-controller 109. The micro-controller 109 supplies an FET control signal 110 (shown in dashed outline in FIG. 1) to control the MOSFET 104, and also supplies a booster enable signal 114 to control operation of the booster 107. The regulated voltage 108 is connected to the voltage Vbat 111 providing power to the micro-controller 109 and establishing a reference voltage for which sense 102 and 103 are measured.

The regulated voltage 108 provides a dual function: it powers the micro-controller 109 and also supplies a fixed reference voltage for the sense 102 and the sense 103. The micro-controller 109 receives analog values from sense 102 and 103 and converts to digital values. This is a standard feature of micro-controllers with analog to digital (A/D). The PIC16F506, from Microchip is an example of such a controller. There are many other examples currently on the market.

The A/D values are relative to the supply voltage of the micro-controller 109. Therefore, it is important to establish a reference voltage via the regulated voltage 108. As an example, say the regulated voltage 108 is fixed at 3.3 volts. This means the resistor values creating the sense 102 and 103 must be chosen such that neither the sense 102 nor the sense 103 exceeds 3.3 volts. Also, since Vbat 111 can range anywhere from 4 volts to 6 volts, the regulated voltage 108 supplies a constant 3.3 volts allowing the micro-controller 109 to differentiate between a fully charged state and a discharged state.

The operation of the battery power supply apparatus 100 is as follows. FIG. 1 schematically depicts a battery power supply apparatus which provides an extended operational life and extended shelf-life. The series of batteries 12 forming the battery portion 101 provides the power source. In the embodiment shown, four series batteries 12 provide a cumulative potential (Vbat 111) that ranges from 3.6 volts when batteries are low to 6.4 volts when batteries are fully charged. For the sake of discussion, it will be assumed that each battery 12 is a typical Alkaline AA battery; however, the invention is not limited thereto but contemplates use of other battery types and other battery chemistries, such as NiCd and NiMH, among others which will be apparent to anyone having skill in the battery power arts.

The MOSFET 104 provides several functions, as follows:
a) When turned OFF, its internal body diode 105 provides a means of sensing current;
b) When turned ON, it provides a zero ohm path for power delivery;
c) When turned OFF, the internal body diode 105 provides a voltage drop when Vbat 111 exceeds the nominal value at output 112

As shown in FIG. 1, the voltage divider resistors (42, 44) and (52, 54) are placed on either side of the MOSFET 104 to create sense potentials 102 and 103. When the MOSFET 104 is turned OFF, sense 102 and sense 103 are equivalent when the output 112 has no load. However, when a load is present, the body diode 105 will conduct providing a standard diode drop which is typically in the range of Vf=0.8 volts. With a load present, the sense 102 will be greater than the sense 103. The FET control signal 110 is used to turn the MOSFET 104 OFF and ON. When MOSFET 104 is turned off, current flows through the body diode 105. Combined with the forward voltage drop across diode 113 of 0.2 volts, a 1 volt drop occurs between Vbat 111 and output 112. When MOSFET 104 is turned ON, it is effectively a short circuit created between the anode and cathode of body diode 105. This is consistent with the paragraph above.

The purpose of the voltage booster 107 is to provide a fixed voltage (i.e., fixed to be within a predetermined target output voltage range) at the output 112. Therefore, whenever the battery voltage Vbat 111 drops below 4.5 volts, for example, the voltage booster 107 is turned on by the micro-controller 109 via the booster enable signal 113 to increase the voltage output at the output 112 to an approximately constant 5 volts.

Voltage boosters exist, for example a NCP1415A (which is commercially available), that typically generate a fixed voltage within 2.5% accuracy of the desired output; in this case, 5.0 volts.

Known voltage boosters usable in the present invention are of the type having the external inductor 106 and operate such that, when switched at a specified frequency, creates a higher potential on the +side of the inductor 106 compared to the −side of the inductor 106. The inductor 106 has the added advantage of passing DC current. Therefore, when the voltage booster 107 is disabled, the inductor 106 acts as a short circuit passing current from the MOSFET 104 to the output 112.

The micro-controller 109 functions to monitor the voltages received by the sense 102 and the sense 103. Depending on the absolute and relative values of sense 102 and sense 103, the micro-controller 109 can determine the specific state in which the battery power supply 100 should operate. These states are shown and discussed below with reference to FIGS. 2 and 3. A regulated voltage source 108 powers the micro-controller 109 in order to establish a reference for measuring the sense 102 and the sense 103. For example, if the battery portion 101 produces a Vbat 111 of 3.6 volts when "dead", then it makes sense to provide a regulated voltage 108 of 3.3 volts to assure proper operation of the micro-controller 109.

Micro-controllers operate within a range of voltages. The 16F506 mentioned earlier operates from as low as 2 volts to as high as 5.5 volts. There is nothing special about this, and it is considered that most or even all micro-controllers operate in this way.

Figure 2:
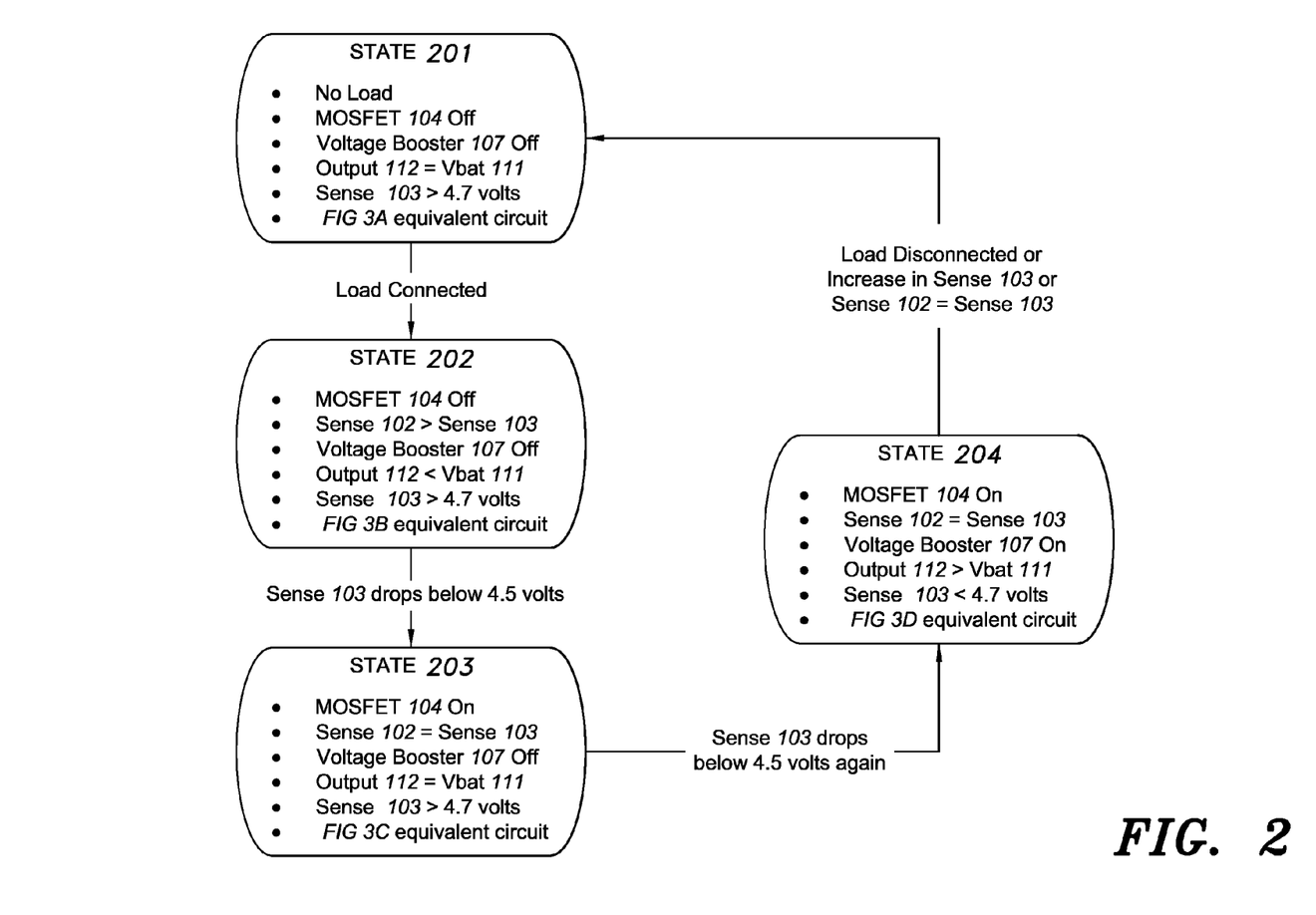
FIG. 2 is a state transition diagram for the battery power supply of the apparatus of FIG. 1 showing four operating states together with conditions for a change of state between the four operating states.

FIG. 2 is a state transition diagram for the battery power supply of the apparatus of FIG. 1 showing four operating states 201, 202, 203 and 204, together with conditions for a change of state between these four operating states. More specifically, FIG. 2 is a state transition diagram showing how internal control is affected by an external load and by the battery voltage level of the battery portion 101. The following discussion will also reference FIG. 3, which shows the equivalent circuits for each of the above-mentioned four states.

Figure 3A:
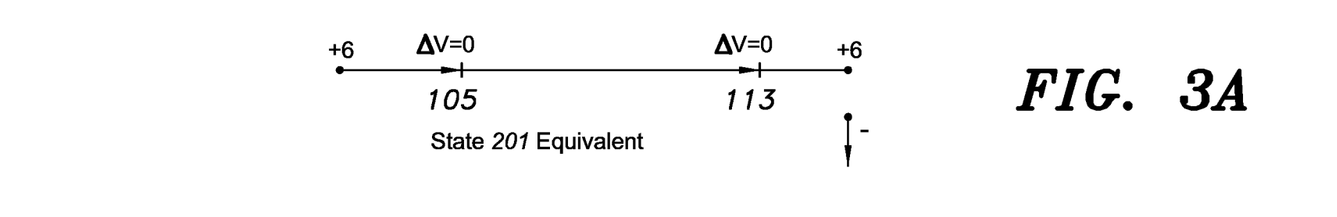
FIGS. 3A-3D schematically show equivalent circuits associated with each of the four states shown in FIG. 2.

The process starts with state 201, in which:
No load connected to the output 112: output is floating.
the MOSFET 104 is OFF: with no load, there is no voltage drop across the body diode 105
the voltage booster 107 is OFF: the inductor 106 acts as a short circuit for DC
the output 112=Vbat 111
the sense 103>4.7 volts: assuming fully charged batteries 12 in the battery portion 101
Equivalent circuit is shown in FIG. 3A

State 201 is a state consuming micro-amps, inasmuch as the micro-controller 109 is in a sleep mode. The resistance of the voltage divider resistors must be selected to be high enough to limit current needed for the sense 102 and the sense 103.

The resistances of the resistors 42, 44, 52, and 54 are referred to in the following as R42, R44, R52, and R54, respectively. The resistances R42 and R44 could for example be 100 ohms. That means the current across the path 40 will be 5 volts/200 ohms=25 mA. The sense 102 will have a value of 2.5 volts. While the sense 102 is within an acceptable range, 25 mA is excessive and adds additional burden on the batteries, which will result in a shorter lifespan. Now, let R42 and R44 be chosen to be 100 K ohms each. Then the sense 102 will still have a value of 2.5 volts, but the quiescent current drawn on path 40 is now 5 volts/200 K ohms=25 micro-amps (0.025 mA)—a much better choice for preserving batteries and extending battery life.

Thus, the values for R42, R44, R52, and R54 are somewhat arbitrary, and one having ordinary skill in the battery powered circuit arts would be able to select suitable resistances; there are almost an unlimited number of values one could choose and still have this circuit work properly.

Figure 3B:
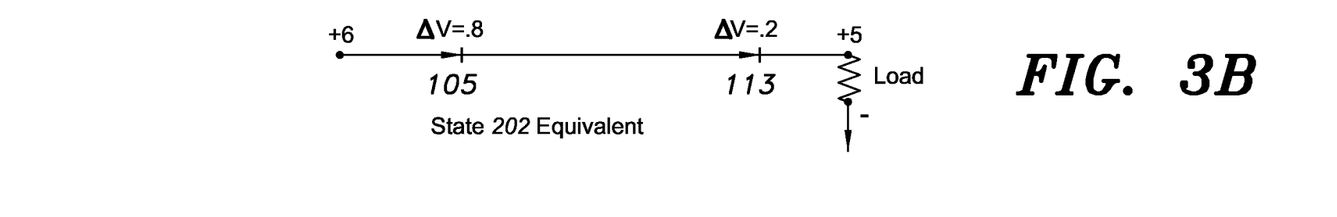

When a load, such as a cell phone 90, is connected to the output 112, the circuit begins to conduct and the battery power supply 100 transitions to a state 202, wherein the state 202 is as follows:
the MOSFET 104 is OFF: a voltage drop is now detected across the body diode 105
the voltage booster 107 is off: inductor 106 acts as a short circuit for DC
the output 112<Vbat 111: due to voltage drop across the body diode 105
if R52 and R54 are of equal value, sense 103>2.35 volts which translates to 4.7 volts at the cathode of body diode 105: this value also appears at output 112 (less the forward bias of Schottky diode 113) and is within the bounds of a +5 volt supply Equivalent circuit is shown in FIG. 3B A cell phone will typically charge itself when provided a supply voltage 112 between 4.5 and 5.5 volts. Output 112 may fluctuate as we transition from one state to the next, but it is all within the bounds of what a cell phone might expect.

Another aspect of the body diode 105 is that it acts as a voltage drop when a fully charged set of batteries 101 creates a Vbat of >5 volts. For example, if Vbat=6 volts, the voltage drop across the body diode 105 (assuming forward voltage drop=0.8 volts and assuming 0.2 volt forward drop across diode 113) creates an output voltage 112 of 5 volts. Every diode has a forward voltage drop associated with it.

Figure 3C:
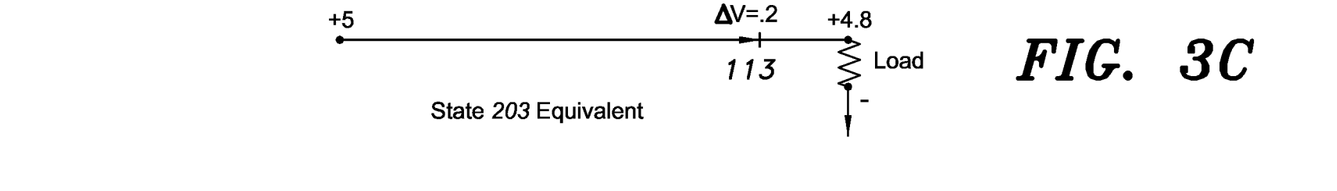
Figure 3D:
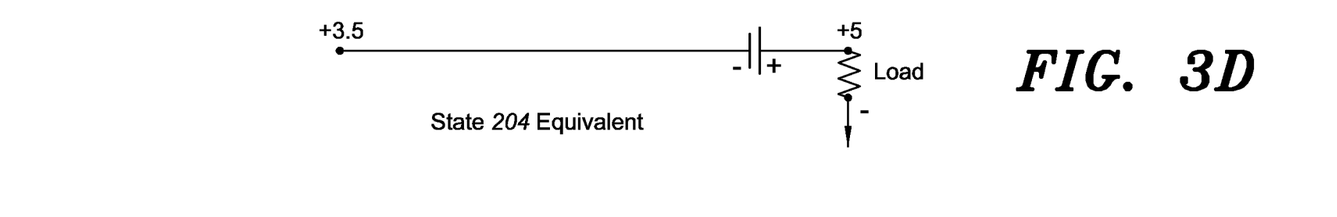

As the load continues to draw current, the voltage Vbat 111 will diminish as battery capacity diminishes. At some point, the voltage at sense 103 will drop below 2.25 volts (4.5 volts at cathode of body diode 105) and the battery power supply 100 transitions from the state 201 to a state 203, wherein the state 203 is as follows:
- the MOSFET 104 is ON: there is no longer a voltage drop across body diode 105
- Voltage booster 107 is OFF: inductor 106 acts as a short circuit to DC
- Output 112=Vbat 111: there is now effectively a short circuit between load and batteries
- Sense 103>4.7 volts: have not yet reached the threshold for enabling voltage booster 107
- Equivalent circuit is shown in FIG. 3C As the load continues to draw even more current, Vbat 111 will drop below 4.5 volts as reflected at the sense 102=2.25 (if R42 and R44 are equal) and the battery power supply 100 transitions to a state 204, in which the state 204 is as follows:
- the MOSFET 104 is ON: there is no longer a voltage drop across the body diode 105
- the Voltage booster 107 is ON: the +side of the inductor 106 has a higher potential than its—side
- Output 112>Vbat 111: the voltage booster 107 provides +5 volts to the load
- Sense 103<2.35 (4.7 volts at cathode of body diode 105): this condition will persist until the load is disconnected
- Equivalent circuit is shown in FIG. 3D Disconnecting the load 90 will cause the voltage Vbat 111 to rise. That is because batteries inherently provide a higher potential under light or no loads as compared with heavier or full loads. Typically, the heavier the load, the more downward pressure there is on the battery output voltage. Because the micro-controller 109 is able to detect a rise in the voltage at sense 102, it can determine whether the load has been disconnected or attached load is fully charged. This can be confirmed by momentarily turning off MOSFET 104, and the micro-processor can optionally be programmed to do this. If sense 102=sense 103, the micro-processor 109 determines that the load has been disconnected. The battery power supply 100 then transitions back to the state 201 wherein current consumption returns to micro-amps.

Figure 4:
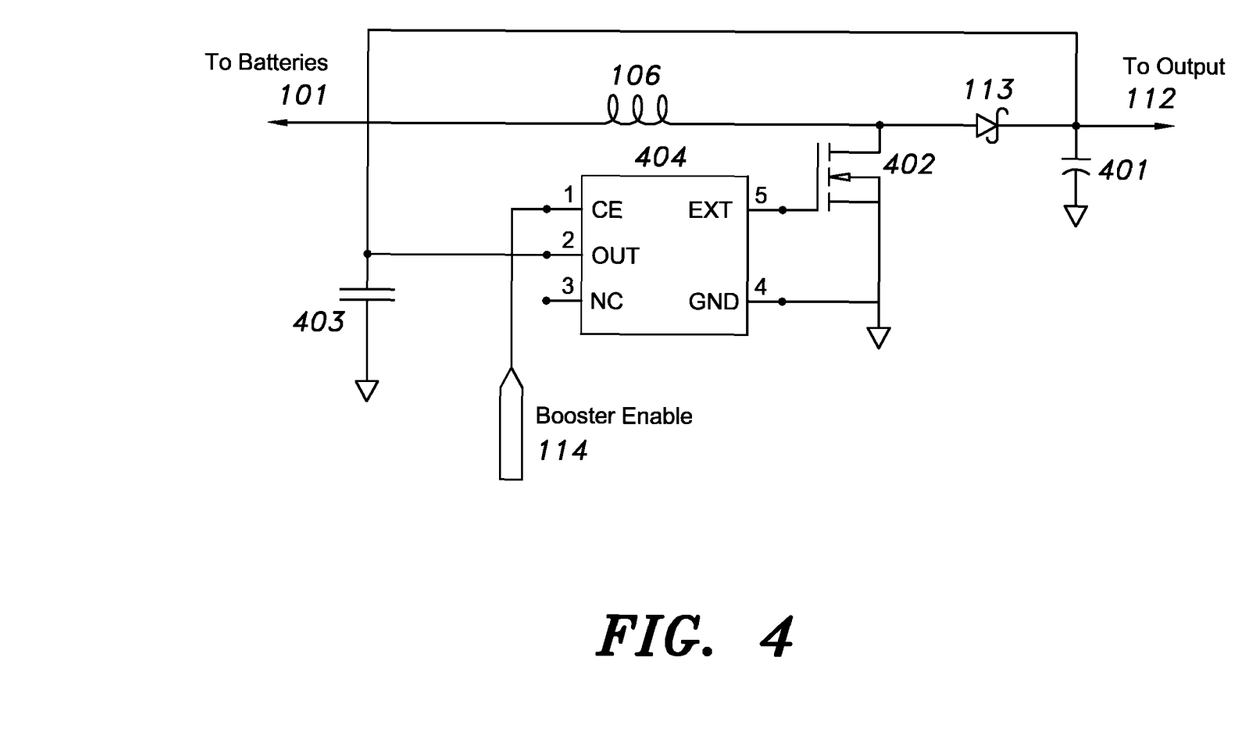
FIG. 4 is an expanded schematic circuit diagram of a voltage booster in the apparatus of FIG. 1.

FIG. 4 is an expanded schematic circuit diagram of the voltage booster 107, which is used in the apparatus of FIG. 1. In FIG. 4, a pulse width modulation (PWM) DC-DC controller 404 is used to switch a switch transistor 402. When the switch transistor 402 is on, the current ramps up in the inductor 106, storing energy in a magnetic field associated therewith. When the external power to the switch transistor 402 is OFF, the energy stored in the magnetic field is transferred to an output storage capacitor 401. A diode 113 is used to block current flowing back into the inductor 106. A capacitor 403 is used to filter output to the monitor pin of PWM controller 404. When PWM controller 404 is enabled, a potential of 5 volts is maintained at an output 112 independent of load when the battery 101 potential falls below a minimum.

Another way of saying the above is that one gets 5 volts at output 112 with a 50 mA load, a 100 mA load, a 200 mA load, or no load. i.e. one gets 5 volts independent of load. The diagram of FIG. 4 represents a conventional circuit that would be understood by anyone having skill in the voltage booster art, and therefore the diagram of FIG. 4 requires no further explanation.

Figure 5:
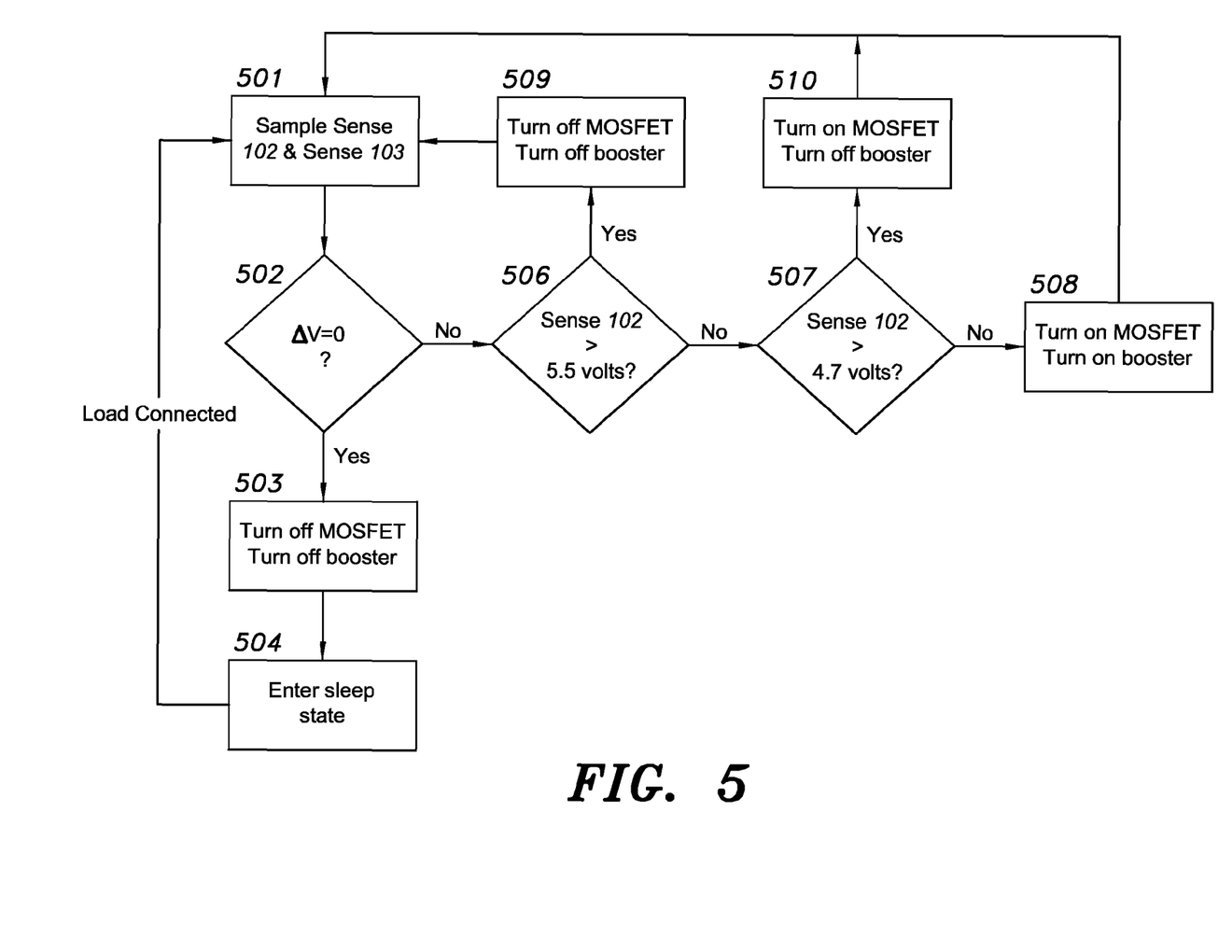
FIG. 5 is a flow chart illustrating operation of the apparatus of FIGS. 1-4, according to the present invention.

FIG. 5 is a flow chart of firmware contained within the micro-controller 109. For the sake of discussion, it is assumed that the output voltage 112 will deliver 5 volts, plus or minus 10%: for example, 4.5 to 5.5 volts with 5.0 volts being the ideal output.

The process starts at step 501 when sense 102 and sense 103 inputs are sampled. If those inputs are equivalent, as in decision block 502, it can be concluded there is no load at output 112. The MOSFET 104 and the voltage booster 107 are turned OFF as shown in block 503 and the micro-controller 109 is put into a sleep state to conserve power. The equivalent circuit is depicted in the aforementioned FIG. 3A. An interrupt caused by a change in the sense 103 causes the controller 109 to wake and proceed with block 501 again.

If decision block 502 indicates there is a difference in potential between the voltages at sense 102 and sense 103, then the path proceeds to a decision block 506. If the voltage at the sense 102 is greater than 5.5 volts, then the MOSFET 104 and the voltage booster 107 are turned OFF in block 509. The voltage drop across the body diode 105 and the diode 113 are used to create an output voltage 112 that is near 5 volts. The equivalent circuit is shown in the aforementioned FIG. 3B.

If the decision block 506 determines that the voltage at the sense 102 is below 5.5 volts, the path then proceeds to a decision block 507. If the voltage at the sense 102 is greater than 4.7 volts, then the MOSFET 104 is turned ON, thereby removing the body diode 105 from the circuit. Current is still passing through the diode 113. The drop across the diode 113 is 0.2 volts if the Schottky variety is used. The equivalent circuit is depicted in the aforementioned FIG. 3C.

If the decision block 507 determines that the voltage at the sense 102 is below 4.7 volts, then the MOSFET 104 and voltage booster 107 are turned ON. The voltage booster 107 is now taking a voltage which is at a relatively lower potential from the battery portion 101 and boosting that voltage to 5.0 volts at the output 112. The equivalent circuit is shown in the aforementioned FIG. 3D.

Figure 6:
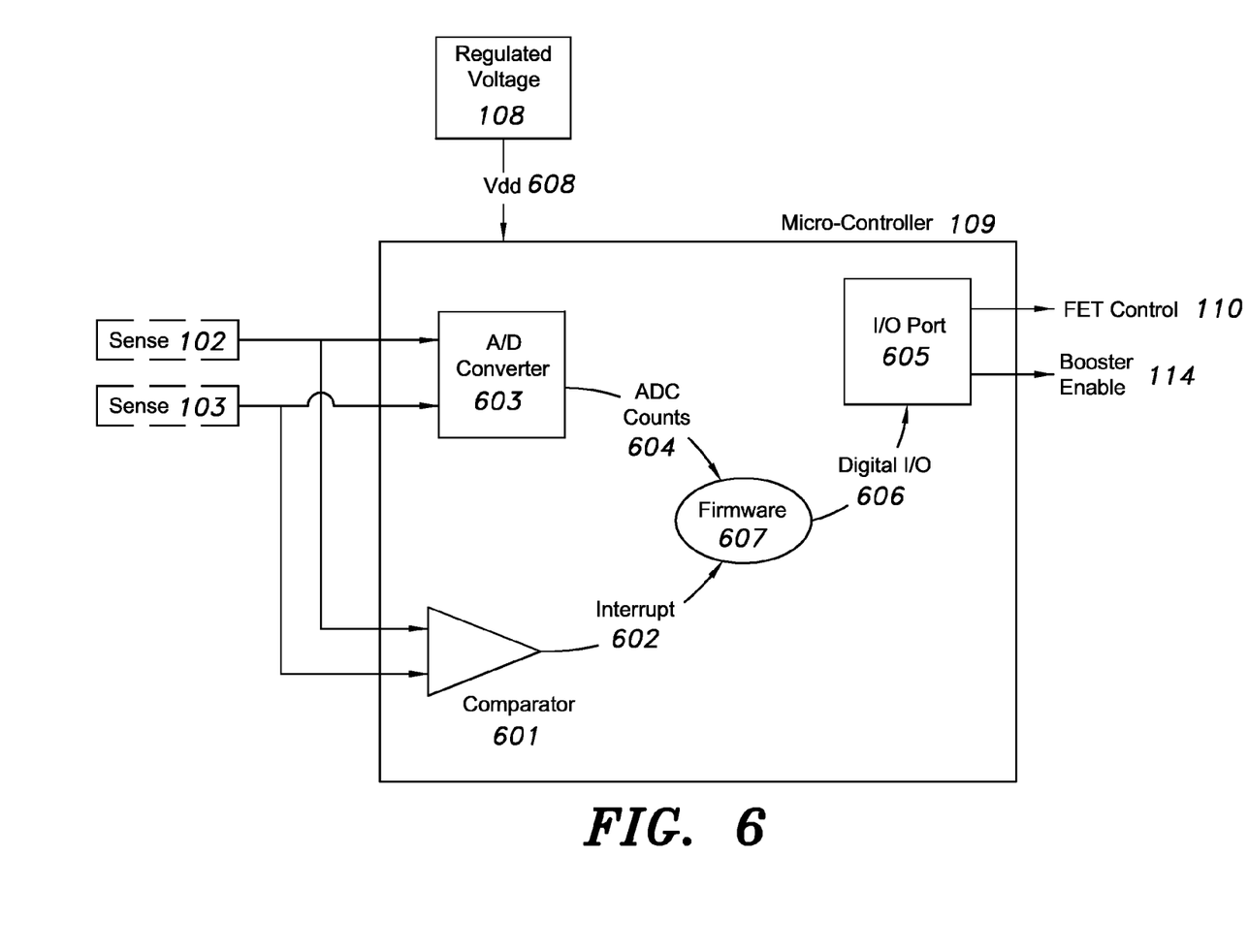
FIG. 6 schematically depicts the micro-controller and its internal components and connections of the device of FIG. 1.

FIG. 6 schematically depicts the micro-controller 109 and its internal components, described below, as well as its connections which are also described below, which is used in the device 100 of FIG. 1. As shown in FIG. 6, the micro-controller 109 includes an A/D converter 603, a comparator 601, an I/O port 605, and firmware 607. The A/D converter 603 and the comparator 601 both receive inputs from the sense 102 and the sense 103. The output of the A/D converter provides ADC counts 604 to the firmware 607. The output of the comparator 601 provides an interrupt 602 to the firmware 607.

The firmware 607 provides a digital I/O 606 to the I/O port 605. The I/O port 605 provides two outputs, an FET control 110 and a booster enable 114. In FIG. 6, the regulated voltage 108 provides a fixed power source Vdd 608 which is supplied to the micro-controller 109 in order to keep the micro-controller 109 powered at all times. The firmware 607 performs the functions which are shown in FIG. 5 and which are described hereinabove with reference to FIG. 5.

The sense 102 and the sense 103 are connected to Analog to Digital Converter (ADC) pins. A simple ADC represents an input voltage by ADC counts 604. The counts are in the range of 0 to 255 for an 8 bit ADC and thus translate a detected voltage potential into a binary value. For example, if Vdd is 3.3 volts and the sense 102 is at 1 volt, the ADC count for the sense 102 would be (1/3.3*255)=4D (hex).

The comparator 601 is used to wake the micro-controller 109 from a sleep state. When entering the sleep state, the sense 102 and the sense 103 are equal. The sense 102 is used to set a reference voltage. When a load begins to draw current, the sense 103 will decrease in value and cause the comparator 601 to change state causing the creation of a wake interrupt 602 which is supplied to the firmware 607. The wake interrupt 602 thereby causes the micro-controller 109 to enter an awake state.

As shown in FIGS. 1 and 6, the micro-controller 109 supplies the FET control 110 and the booster enable 114 as digital outputs that change state when the firmware 607 writes data to the I/O port 605.

The foregoing embodiments are described in sufficient detail to enable those skilled in the art to make and use the invention, and it is to be understood that other embodiments would be evident based on the present disclosure and that process or mechanical changes may be made without departing from the scope of the present invention.

In the foregoing description, numerous specific details are given to provide a thorough understanding of the invention. However, it will be apparent that the invention may be practiced without these specific details. In order to avoid obscuring the present invention, some well-known circuits, system configurations, and process steps are not shown in detail and would be understood by anyone having skill in the relevant art.

Likewise, the drawings showing embodiments of the apparatus/device are semi-diagrammatic and not to scale and, particularly, some of the dimensions are for clarity of presentation and may be shown greatly exaggerated in the drawings.

While the invention has been described in conjunction with a specific preferred embodiment which is considered to be the best mode, it is to be understood that many alternatives, modifications, and variations will be apparent to those skilled in the art in light of the foregoing description and accompanying drawings. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation for a power supply comprising:
    measuring a first sense potential of a power source;
    measuring a second sense potential coupled to the first sense potential in parallel across a relative isolation unit;
    comparing the first sense potential to the second sense potential with a microcontroller to generate a potential booster enable;
    providing a potential booster controlled by the potential booster enable from the microcontroller; and
    controlling an output potential based on the potential booster.

2. The method as claimed in claim 1 wherein controlling the output potential includes turning off the relative isolation unit and turning off the potential booster where the first sense potential is above a first threshold potential.

3. The method as claimed in claim 1 wherein controlling the output potential includes turning off the relative isolation unit and turning off the potential booster where the first sense potential is below a first threshold potential and above a second threshold potential.

4. The method as claimed in claim 1 wherein controlling the output potential includes turning off the relative isolation unit and turning off the potential booster where the first sense potential equal to the second sense potential.

5. The method as claimed in claim 1 wherein controlling the output potential includes turning on the relative isolation unit and turning on the potential booster where the first sense potential is below a second threshold potential.

6. A method of operation for a power supply comprising:
    measuring a first sense potential for determining a power source potential of a power source;
    measuring a second sense potential through a relative isolation unit controlled by an isolation control;
    comparing the first sense potential with the second sense potential with a microcontroller to generate a potential booster enable and the isolation control;
    providing a potential booster controlled by the potential booster enable from the microcontroller; and
    controlling an output potential based on the potential booster.

7. The method as claimed in claim 6 wherein controlling the output potential includes turning off the relative isolation unit and turning off the potential booster where the first sense potential is above a first threshold potential.

8. The method as claimed in claim 6 wherein controlling the output potential includes turning off the relative isolation unit and turning off the potential booster where the first sense potential is below a first threshold potential and above a second threshold potential.

9. The method as claimed in claim 6 wherein controlling the output potential includes turning off the relative isolation unit and turning off the potential booster where the first sense potential equal to the second sense potential.

10. The method as claimed in claim 6 wherein controlling the output potential includes turning on the relative isolation unit and turning on the potential booster where the first sense potential is below a second threshold potential.

11. A power supply comprising:
    a power source;
    a microcontroller for comparing a first sense potential with a second sense potential for generating a potential booster enable;
    a relative isolation unit for isolating the first sense potential from the second sense potential; and
    a potential booster for controlling an output potential, the potential booster controlled by the potential booster enable from the microcontroller.

12. The power supply as claimed in claim 11 wherein the output potential is determined by turning off the relative isolation unit and turning off the potential booster where the first sense potential is above a first threshold potential.

13. The power supply as claimed in claim 11 wherein the output potential is determined by turning off the relative isolation unit and turning off the potential booster where the first sense potential is below a first threshold potential and above a second threshold potential.

14. The power supply as claimed in claim 11 wherein the output potential is determined by turning off the relative isolation unit and turning off the potential booster where the first sense potential equal to the second sense potential.

15. The power supply as claimed in claim 11 wherein the output potential is determined by turning on the relative isolation unit and turning on the potential booster where the first sense potential is below a second threshold potential.

16. The power supply as claimed in claim 11 further comprising an isolation control for controlling the relative isolation unit, the isolation control calculated by the microcontroller based on the difference between the first sense potential and the second sense potential.

17. The power supply as claimed in claim 16 wherein the output potential is determined by turning off the relative isolation unit and turning off the potential booster where the first sense potential is above a first threshold potential.

18. The power supply as claimed in claim 16 wherein the output potential is determined by turning off the relative isolation unit and turning off the potential booster where the first sense potential is below a first threshold potential and above a second threshold potential.

19. The power supply as claimed in claim 16 wherein the output potential is determined by turning off the relative isolation unit and turning off the potential booster where the first sense potential equal to the second sense potential.

20. The power supply as claimed in claim 16 wherein the output potential is determined by turning on the relative isolation unit and turning on the potential booster where the first sense potential is below a second threshold potential.

* * * * *

UNITED STATES PATENT AND TRADEMARK OFFICE
CERTIFICATE OF CORRECTION

| | |
|---|---|
| PATENT NO. | : 9,837,895 B2 |
| APPLICATION NO. | : 15/083249 |
| DATED | : December 5, 2017 |
| INVENTOR(S) | : Simon B. Johnson |

Page 1 of 1

It is certified that error appears in the above-identified patent and that said Letters Patent is hereby corrected as shown below:

In the Specification

In Column 5, Line 42, delete "113" and insert --114-- therefor

Signed and Sealed this
Twenty-eighth Day of May, 2019

Andrei Iancu
*Director of the United States Patent and Trademark Office*